July 27, 1937.   H. LOVE   2,088,298
MACHINE FOR CUTTING POTATOES APPLICABLE TO ANALOGOUS PURPOSES
Filed Jan. 31, 1934   3 Sheets-Sheet 1

Inventor
H. Love.
by
W. E. Evans
Attorney

July 27, 1937.  H. LOVE  2,088,298
MACHINE FOR CUTTING POTATOES APPLICABLE TO ANALOGOUS PURPOSES
Filed Jan. 31, 1934   3 Sheets-Sheet 2

Inventor
H Love.
by
W. E. Evans,
Attorney.

July 27, 1937.                    H. LOVE                    2,088,298
MACHINE FOR CUTTING POTATOES APPLICABLE TO ANALOGOUS PURPOSES
                Filed Jan. 31, 1934        3 Sheets-Sheet 3

Inventor
H. Love.
by
W. E. Evans
Attorney

Patented July 27, 1937

2,088,298

UNITED STATES PATENT OFFICE 2,088,298

MACHINE FOR CUTTING POTATOES APPLICABLE TO ANALOGOUS PURPOSES

Harry Love, Blackwood, England

Application January 31, 1934, Serial No. 709,164
In Great Britain February 4, 1933

4 Claims. (Cl. 146—78)

This invention relates to machines for cutting potatoes or vegetables into slices, and is especially applicable in the production of so-called "chips" by cutting in two operations, whereby slices are first cut and the slices are then cut into chips or into long pieces or strips.

According to the invention potatoes or vegetables are sliced by their movement upon or within a slide or the equivalent over and against the edge of a stationary knife by which the potato or the like is thus cut on its underside in a slice of determined thickness, the slice being cut from the potato on the slide moving forward, whereby the slice then passes into position into a space traversed by a series of parallel knives by which the slice may then be cut into chips.

According to the invention, moreover, the slicing may be performed in the reciprocation of a slide or the equivalent within which a cavity or cavities is or are provided of such a depth or of such a form that in operation the upward movement of the potato out of the cavity is precluded, and the potato is fixedly held within the cavity in the slide as it moves forward over and into contact with the edge of the stationary knife.

According to the invention, moreover, the stationary knife or holder is so formed that in the cutting operation the slice is caused to move downwardly into a space or channel to fall into a position traversed by a series of substantially parallel knives, whereby the slice may be cut into a number of chips.

According to the invention, moreover, the slide or the equivalent by which the potato or the like is moved forward over and in contact with the stationary knife may itself serve for the support of the series of knives by which the cutting of the slice into chips may be effected. Thus for example a parallel vertical series of knives may be mounted within or upon a carrier depending from the forward end of the slide or the equivalent, the knives of the series being advantageously horizontally disposed or otherwise inclined and guided within grooves or slots and advantageously passing through slots or interstitial spaces in the oppositely disposed walls of the space into which the slice falls, so that thus the knives traverse that space and thus cut the slice into chips.

The carrier referred to may according to the invention be provided with or have connected to it a sliding plate so positioned that it moves forward to intercept and to support the slice after it has been cut, in the space traversed by the series of knives in order that the slice may be cut into chips and so that in the return stroke of the slide the plate may move backward to permit of the slice falling into a receptacle conveniently placed beneath the space referred to.

According to the invention, moreover, the arrangement may be such that the cutting of the slice into chips may be effected in the same stroke or in the subsequent return stroke of the reciprocating slide. Thus the slicing may be effected at the commencement of movement of the slide, and the slice may then be cut into chips in the later part of the stroke on the slice falling into the position in the space traversed by the knives, or the slice may be cut into chips on the subsequent return movement of the reciprocating slide.

Or again the series of knives for cutting the slices into chips may be operated independently of the slide used for slicing and the operation of the parts timed or determined in order that these operations may be successively performed, as for example by movement derived from a rotating shaft by means of connecting rods or links connected in different positions thereon.

It will thus be understood that the reciprocating slide and the knives may be provided so as to reciprocate as may also the sliding plate and that any suitable mechanism may be employed to effect and to adjust their movement as is required according to the operations to be performed in slicing the potato, in cutting the slice and in intercepting and supporting the slice, and that the movements may all be effected in the reciprocation of one part such as the slide or the equivalent, but that the respective parts may be independently operated in any convenient manner in order that the operations may be performed in proper sequence.

According to the invention, moreover, the vertical series of knife blades may advantageously be set out of vertical coincidence, so that thus in the return stroke of the slide the lowermost blade first enters the space in which the slice is deposited and then passes to the other side of the space, and then the blade next above it, and so on in succession until the uppermost blade enters and traverses the space to the other side of the space at the end of the return stroke, and thus in the forward stroke the uppermost blade first moves through and out of the space, then the blade next beneath it, and so on in succession until the lowermost blade moves out, it being understood that the supporting plate carried by the slide and adapted to move into position beneath the space, moves beneath the space at the end of the forward stroke and thus intercepts the slice and prevents its fall through until the commencement of the return stroke. By such an arrangement of the blades the cutting of the chips is successively performed and the cutting operation extends throughout the return stroke or for the greater part.

The invention further comprises the features of construction which are hereinafter described.

The invention is diagrammatically illustrated by way of example in the accompanying drawings.

Figure 1:
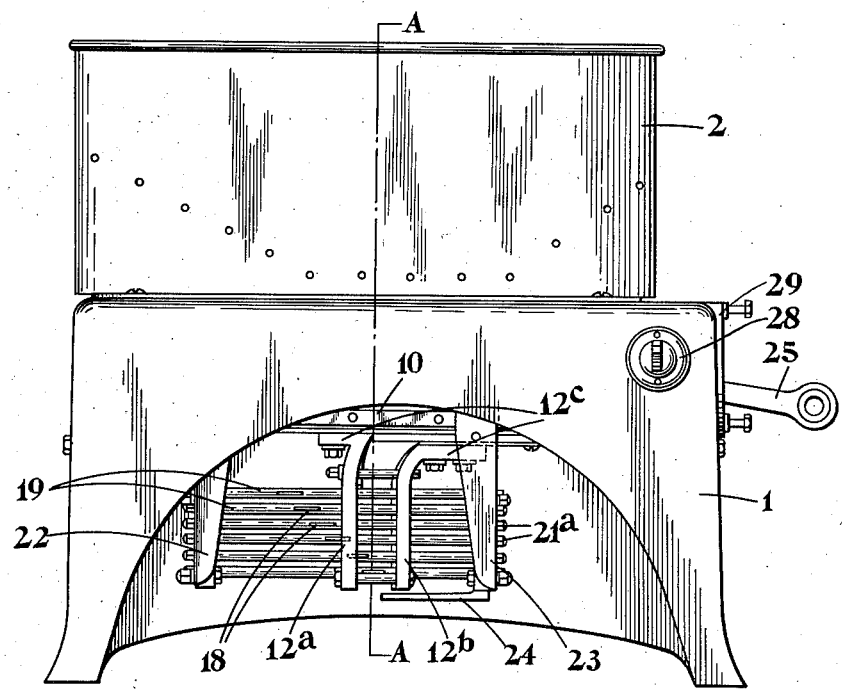
Figure 1 is a side elevation of the machine.
Figure 2:
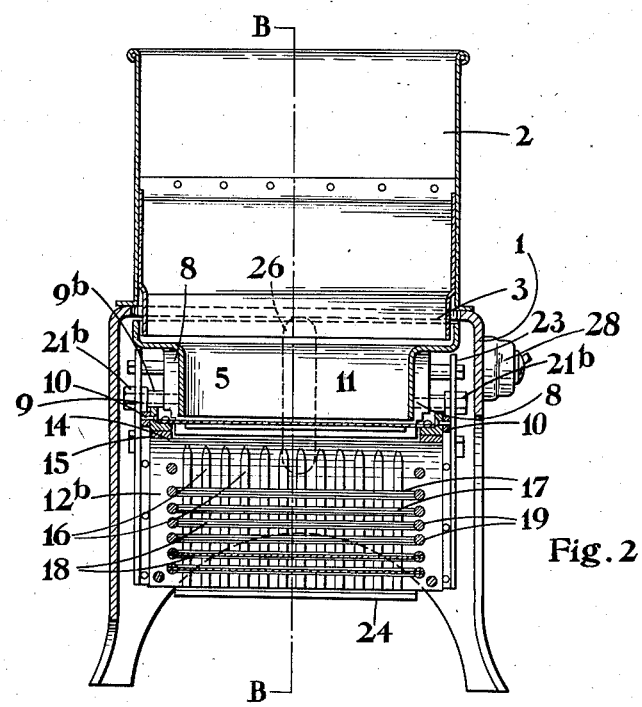
Figure 2 is a sectional end elevation on the line A—A of Figure 1.
Figure 3:
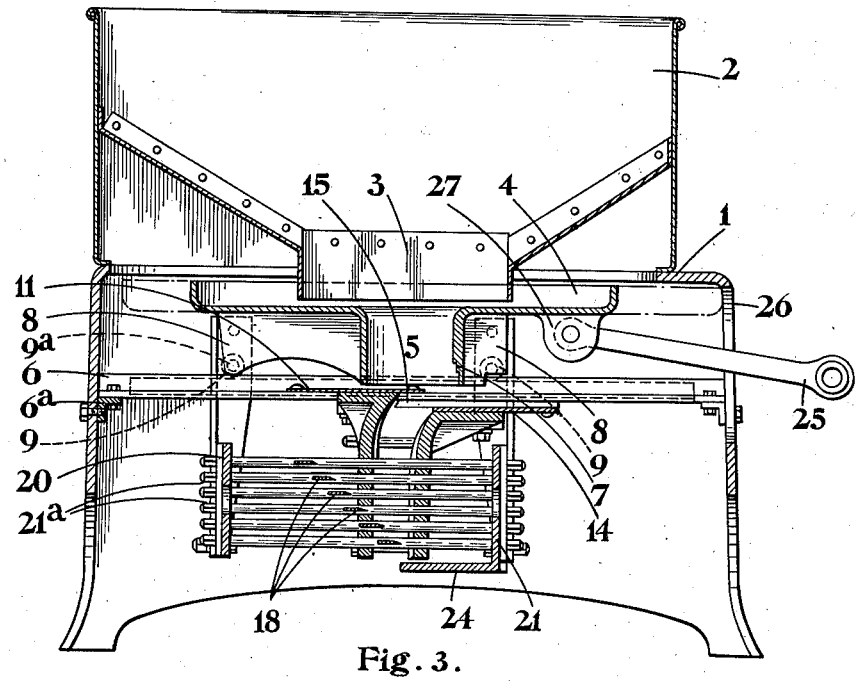
Figure 3 is a sectional side elevation on the line B—B of Figure 2.
Figures 6, 7:
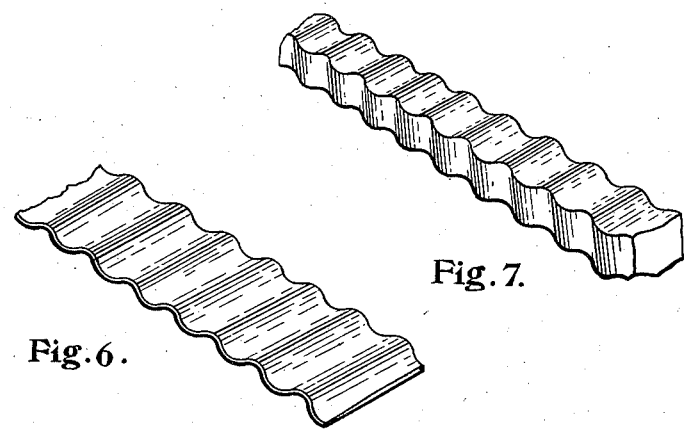
Figure 6 is a perspective view on an enlarged scale of a modified construction of knife blade according to the invention.
Figure 7 is a perspective view of a potato "chip" cut in the machine provided with the modified construction of knife blade illustrated in Figure 6.
Figure 4:
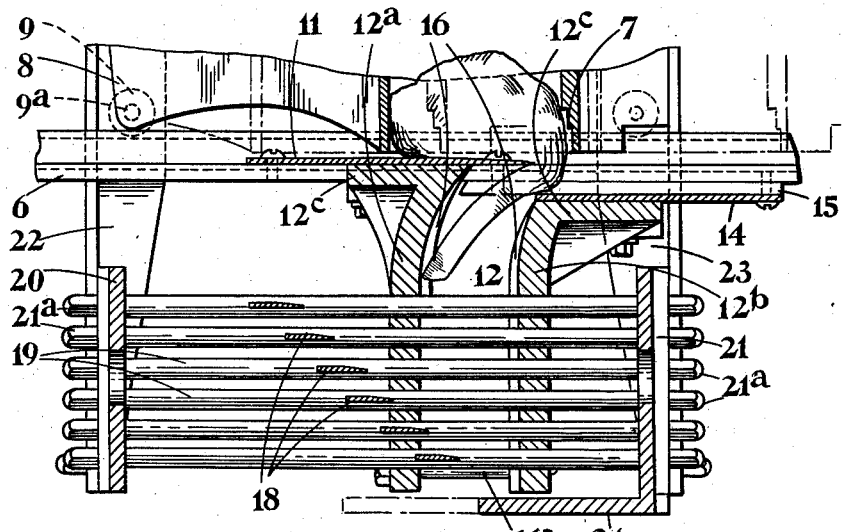
Figure 4 is a sectional side elevation on an enlarged scale of the moving parts of the machine showing the cutting operation.
Figure 5:
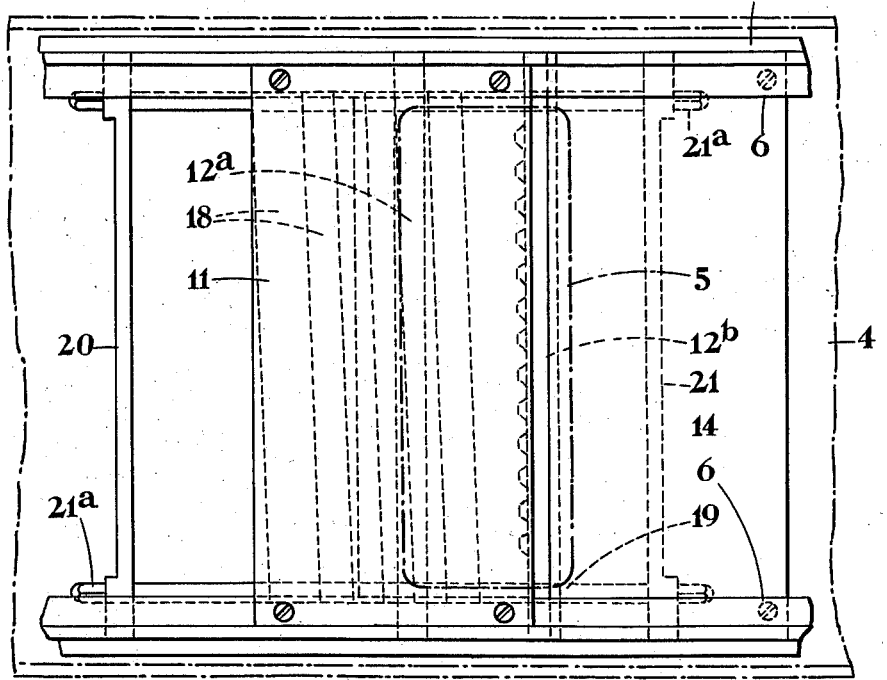
Figure 5 is a plan view corresponding to Figure 4.

In carrying the invention into effect according to one construction the machine comprises a frame 1 formed as a casing to enclose the moving parts of the machine on and above which frame is mounted a hopper 2 of conical form, the conical end of the hopper supporting a downwardly extending part 3 which projects below the upper surface of the frame 1 which is cut away for the purpose. The part 3 extends to a distance short of the bottom of a slide 4 formed as a tray with shallow side walls and of substantially rectangular and elongated form. In a determined position beneath the extension 3 of the hopper 1 in the slide 4 is formed a cavity 5 to receive potatoes from the part 3 of the hopper 1. The cavity 5 is advantageously provided integrally in the slide 4 and the walls of the cavity 5 may thus extend downwardly to the plane of horizontally disposed parts of transverse L-shaped frame members 6 secured by brackets 6a on the inner walls of the frame 1 and extending across the frame to support the moving parts of the machine, the horizontally disposed parts of the L-shaped frame members 6 being inwardly directed. The cavity 5 extends transversely across the slide 4 in an approximately central position and may for example be of a length (that is, transversely of the slide) of 7", a width of 2¾" and a depth of 3" (or more or less), the cavity being so formed that whatever the size of the potato its upward movement in the cavity 5 is precluded. Thus, for example, the rear wall of the cavity 5 may be inclined forward towards the upper end or may be stepped as at 7, or the walls may be uniformly inclined inwards towards the top of the slide 4. The slide 4 is provided with a pair of downwardly depending lateral brackets 8 disposed parallel and secured to or formed integral with the bottom of the slide. On the brackets 8 are mounted rollers 9 on outwardly extending spindles 9a on which are mounted distance pieces 9b formed as sleeves, the distance pieces being provided between the rollers 9 and the brackets 8. The rollers 9 are adapted to run on rails 10 formed as strips of metal of rectangular section and secured externally of the vertically disposed parts of the L-shaped frame members 6. Immediately beneath the cavity 5 is a transversely disposed knife blade 11 mounted on the horizontally disposed parts of the frame member 6. The knife blade 11 extends rearwardly to form a support for the potatoes within the cavity 5 in the latter part of the forward stroke of the slide 4, the arrangement being such that on the slide 4 assuming its forward position the rear transverse wall of the part 3 of the hopper 1 extends over or beyond the cutting edge of the stationary knife blade 11. The knife 11 may have a straight edge as shown in Figures 2 to 5 which may conveniently be disposed at an inclination or alternatively the knife may be formed with a corrugated edge as shown in Figure 6. Forward of the cutting edge of the stationary knife blade 11 a supporting plate 14 extends beneath the slide for the purpose of supporting the potatoes to be cut in their lowest position assumed when the slide 4 reaches the extreme position in readiness for a forward movement for cutting the slice. The plate 14 may be adjusted in its vertical position so as thus to vary the thickness of the slice. Two spacing members 15 formed as metal strips advantageously the width of the horizontally disposed part of the L-shaped frame members 6 are secured on the underside of the said parts of the frame members between the frame members and the supporting plate 14 and extend at each side beyond the cutting edge of the blade 11 in a plane below the plane of the blade 11. The supporting plate 14 is disposed in a plane beneath the plane of the cutting blade 11 to an extent for example of ½" (or more or less) and the supporting plate 14 extends short of the cutting edge of the blade 11 to the extent, for example, of ⅜" (or more or less). Thus an opening is formed through which the slice in being cut may pass forward and downward in the cutting operation into the vertically disposed space 12 beneath the slide 4, which the slice then occupies in the return movement of the slide, and in which it is cut into chips or into long pieces or strips. Thus the space 12 extends beneath the stationary slicing blade 11, and is advantageously formed by front and rear walls 12a and 12b that may be substantially parallel and vertically disposed and set apart for example a distance of ¾ inch to 1½ inches (or less) for the main part of their length, the inner and oppositely disposed faces of the respective walls being at the upper end diverted or curved in direction towards the opening beyond the cutting edge of the stationary blade 11, and at these curved faces vertically disposed ribs 16 may be provided which on the inner face of the front wall 12a may be continued to the bottom to avoid the adherence of the slice or slices or the cut parts thereof to the respective faces, and especially to the inner face of the front wall 12a as the result of the cutting operation in the return movement of the slide 4. The walls 12a and 12b are suitably mounted beneath the supporting frame members 6 and are set at determined distances apart by means of transverse bolts 16a. The upper part of the walls 12a, 12b defining the space 12 into which the slice passes on being cut are at their respective upper ends outwardly diverted to form flanges 12c by which they may be respectively supported in position beneath the supporting frame member 6, it being understood that the space 12 is freely open at the lower end at which the chips or long pieces or strips are discharged. The walls 12a and 12b are provided with a vertical series of coincident slots 17 extending respectively a little short of their length, through which reciprocating cutting blades 18 may pass in the reciprocation of the slide 4, and at their ends the slots 17 are enlarged and formed to a circular or other shape for the accommodation of sliding rods 19 disposed parallel with the line of movement of the slide 4, the rods 19 being conveniently of a circular cross-section and provided in vertical series to pass transversely through the walls 12a and 12b near their respective ends. The rods 19 are adapted in pairs one in each series to carry the reciprocating cutting blades 18 advantageously by means of diametric slots formed therein through which the respective ends of the blades 18 are passed and the ends secured in that position. The rods 19 are carried at their respective ends within front and rear end plates 20, 21 disposed parallel with the walls 12a, 12b, and these end plates are suitably carried in downwardly extending brackets 22, 23 depending from the reciprocating slide 4 on the outer walls of which they are secured by bolts 21a, the spindles 9a of the rollers 9 also extending through the walls of the brackets being screw-threaded to be secured by means of nuts 21b. On the rearward end plate 21 a slice supporting plate 24 is mounted and set horizontally so as to extend with its front edge slightly beyond the lowermost of the reciprocating cutting blades 18.

It will be understood that the reciprocating blades 18 may be provided of a uniform width for example of ½ inch (or more or less), and may be provided with cutting edges at the front and back, it being, however, understood that in the construction of machine described the cutting operation is performed in the return movement of the slide 4, and thus only the front edges of the blades 18 normally cut the slice. By providing the rear edges also as cutting edges jamming or obstruction is avoided in case any part of the cut slice does not fall out of the space 12 on the blades 18 passing out.

The reciprocating blades 18 are advantageously disposed at an inclination in a substantially horizontal plane, and may all be disposed at the same inclination in the manner hereinbefore described.

The slicing blade 11 or the cutting blades 18 may be provided so as instead of cutting with a flat face to cut with a serrated edge and faces as illustrated in Figure 6. Thus for example the slicing blade may be provided of a serrated form in which the serrations are disposed parallel with the line of movement of the slide and may have flat faces for example of ¼ inch in depth (or more or less).

Means are provided for imparting a reciprocatory movement to the slide and such means may comprise an electric motor connected through gearing to a connecting rod 25 which passes through an opening 26 formed in one of the end walls of the casing 1 and pivotally secured to a lug 27 formed on one of the end walls of the slide 4, the motor casing being secured by bolts or the equivalent on an end plate 29 on the casing 1 and controlled by the switch 28.

In the operation of the machine the potato (or potatoes) falls from the hopper 2 into the part 3 and thence into the cavity 5 of the slide 4 in which it is held from upward movement as hereinbefore described and rests upon the supporting plate 14 to project beyond the bottom edges of the cavity 5.

In the forward movement of the slide 4 the potato is carried forward so that that part of the potato projecting beyond the bottom edges of the cavity 5 is cut by the stationary blade 11, the cut slice falling into the space 12, and being prevented from falling through the space 12 by the slide supporting plate 24.

In the return movement of the slide the reciprocating cutting blades 18 traverse the space 12 in succession cutting the potato slice into chips, the slice supporting plate 24 being carried rearwardly to permit the chips to fall from the space 12 into a receiver conveniently provided beneath.

It will be understood that the invention is not limited to the construction of machine hereinbefore described, but may be carried into effect in widely varying construction and for purposes other than the cutting of potatoes into chips.

Furthermore, the slices, on being separated, may be cut into chips by any means operating alternately with or successively upon the slicing The machine hereinbefore specifically described with references to the accompanying drawings is intended for the slicing of potatoes. It will however be understood that a machine according to the invention is applicable for a wide variety of purposes, such as slicing root crops or stoneless fruit, for example turnips or swedes, it being understood that according to the particular material to be cut the size of the cavity may be varied as may also be the stroke of the slide. In general it is found convenient to make the cavity 5 relatively long and to extend across the machine, whereby the potatoes when such are to be sliced are disposed lengthwise of the cavity and transversely of the line of movement of the slide. The width of the cavity 5 is so determined as to accommodate potatoes of a maximum width, such as 2¾" but where the maximum size of potatoes is substantially more the width of the cavity would be correspondingly greater, while similarly for material such as turnips or swedes the cavity 5 would have a correspondingly greater width and length. The width of the cavity should not however be so excessive as to facilitate one potato being accommodated at the back of the other in the width of the cavity, it being advisable that the width should be such as only to accommodate one potato, there being in general either one or two passing lengthwise into the cavity 5 from the hopper in the construction specifically described.

It will furthermore be understood that the plate 14 may be replaceable by plates of varying thickness as a simple means of varying the depth of cut of the slice, it however being understood that the slice should not be excessively thin, that is to say so thin as not to be projected without substantial deformation into the space 12 on slicing and so as to fall on to the supporting plate 24.

I claim:—

1. A machine for cutting potatoes and other materials into chips, comprising a supporting frame and a carriage adapted for reciprocation upon a track forming part of the said frame, a slice cutter in fixed relation to the frame, a receiver for the material to be cut into slices in fixed relation to the said carriage and reciprocated thereby in a direction parallel with the plane of the slice cutter, a receptacle mounted on said frame in close relation to the slice cutter and formed to divert the slice cut into a position substantially normal to the plane of the slice cutter, a series of knives set in parallel planes and carried by the said carriage for a movement of reciprocation relatively to the said receptacle which is provided to permit the passage of the knives in the direction normal to the plane of the slice, and means for effecting the reciprocation of the carriage upon the frame.

2. A machine for cutting potatoes and other materials into chips, according to claim 1, having in fixed relation to the receptacle and in advance of the slice cutter, a surface upon which the material within the receiver may rest for the cutting of the slice.

3. A machine for cutting potatoes and other materials into chips, comprising a stationary hopper, a reciprocating slide disposed below and in proximity to the outlet of the hopper, said slide being provided with an open vertical cavity to receive the material to be cut, said cavity being transversely disposed to the direction of movement of the slide in its reciprocation, a stationary knife mounted in position below the said slide and co-operating with the slide to cut the material into slices, a receptacle into which the slices pass on being cut, the said receptacle having oppositely disposed walls slotted with a vertical series of slots, and a vertical series of reciprocating knives for cutting the slice into pieces on the knives traversing the slotted walls of the said receptacle, the hopper being adapted to receive and being formed to guide the material to be cut into the transversely disposed cavity of the slide.

4. A machine for cutting potatoes and other materials into chips, comprising a stationary hopper for the material to be cut, a reciprocating slide disposed below the said hopper and provided with an open vertical cavity for the reception of the material from the hopper, a stationary slice cutter with which the reciprocating slide co-operates for the slicing of the material, a receptacle into which the slices pass on being cut, the said receptacle having oppositely disposed walls slotted with a vertical series of slots and a vertical series of reciprocating knives for cutting the slice into pieces on the knives traversing the slotted walls of the said receptacle, and means for the suspension of the series of knives from the reciprocating slide.

HARRY LOVE.